(12) United States Patent
Hendren, III

(10) Patent No.: US 6,701,415 B1
(45) Date of Patent: Mar. 2, 2004

(54) SELECTING A CACHE FOR A REQUEST FOR INFORMATION

(75) Inventor: C. Hudson Hendren, III, Strasburg, VA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/282,806

(22) Filed: Mar. 31, 1999

(51) Int. Cl.[7] .............................................. G06F 12/00
(52) U.S. Cl. ....................... 711/138; 711/119; 709/203; 709/213
(58) Field of Search ............................ 711/118, 3, 119, 711/138, 154; 709/200, 203, 213, 214, 215, 217, 225, 226, 212

(56) References Cited

U.S. PATENT DOCUMENTS

| | | | |
|---|---|---|---|
| 5,542,087 A | | 7/1996 | Neimat et al. |
| 5,754,844 A | * | 5/1998 | Fuller .......................... 707/6 |
| 5,864,852 A | | 1/1999 | Luotonen |
| 6,038,601 A | * | 3/2000 | Lambert et al. ............ 709/226 |
| 6,070,191 A | | 5/2000 | Narendran et al. |
| 6,112,279 A | * | 8/2000 | Wang ......................... 711/119 |
| 6,128,623 A | * | 10/2000 | Mattis et al. ............... 707/103 |
| 6,128,627 A | * | 10/2000 | Mattis et al. ............... 707/202 |
| 6,134,583 A | * | 10/2000 | Herriot ....................... 709/217 |
| 6,167,438 A | | 12/2000 | Yates et al. |
| 6,189,046 B1 | * | 2/2001 | Moore et al. ............... 709/315 |
| 6,205,481 B1 | | 3/2001 | Heddaya et al. |
| 6,212,565 B1 | * | 4/2001 | Gupta ......................... 709/229 |
| 6,282,581 B1 | * | 8/2001 | Moore et al. ............... 709/316 |
| 6,314,465 B1 | | 11/2001 | Paul et al. |
| 6,351,767 B1 | | 2/2002 | Batchelder et al. |
| 2002/0035672 A1 | | 3/2002 | Challenger et al. |

FOREIGN PATENT DOCUMENTS

| | | |
|---|---|---|
| EP | 0 871 127 | 10/1998 |
| WO | WO 98/53410 | 11/1998 |

OTHER PUBLICATIONS

Duane Wessels et al., ICP and the Squid Web Cache, IEEE Journal on Selected Areas in Communications, vol. 16, No. 3, Apr. 1998, pp. 345–357.

Anawat Chankhunthod et al., A Hierarchical Internet Object Cache, Proceedings of the USENIX Annual Technical Conference, Jan. 22–26, 1996, San Diego, California.

Donald Neal, The Harvest Object Cache in New Zealand, Computer Networks and ISDN Systems, vol. 28, No. 11, May 1, 1996, pp. 1415–1430.

Danzig, P., "NetCache Architecture and Deployment", Nov. 25, 1998, North Holland Publishing, Amsterdam.

Goulde, Michael A., "Network Caching Guide Optimizing Web Content Delivery". Patricia Seybold Group, Mar. 1999. pp. 1–41.

Help page from Netscape Navigator 2.0: 1996.

* cited by examiner

*Primary Examiner*—Tuan V. Thai
(74) *Attorney, Agent, or Firm*—Fish & Richardson P.C.

(57) ABSTRACT

Methods and systems for handling requests received from a client for information stored on a server. In general, when a request for information is received, cache functions are bypassed or executed based on whether an execution of cache functions in an attempt to access the information from cache is likely to slow processing of a request for the information without at least some compensating reduction in processing time for a request for the information received at a later time. Also described is receiving information that identifies the location of a resource within a domain and selecting a cache based on the information that identifies the location of the resource within the domain.

30 Claims, 10 Drawing Sheets

SELECTING A CACHE FOR A REQUEST FOR INFORMATION

TECHNICAL FIELD

This invention relates to selecting a cache that stores information received from a network site.

BACKGROUND

Computer networks such as the Internet provide users with a powerful tool for acquiring and distributing information. Since the emergence of the World Wide Web in the early 1990s, users have flocked to the Internet in growing numbers. The corresponding increase in network traffic, however, has increased the length of time users must wait to receive information. During busy periods, users commonly wait several minutes for complex Web-pages to load.

Many computers on the World Wide Web communicate using HTTP (HyperText Transfer Protocol). HTTP defines a client/server relationship between clients requesting resources (e.g., HTML (HyperText Markup Language) documents, audio, video, graphics, executable or interpreted instructions, and other information) and servers offering those resources. As shown in FIG. 1, a client 100 transmits a request for a resource 104 to a server 102 providing the resource 104. The server then transmits a response that can include the requested resource 104 along with other information such as any errors that may have occurred. Software running on the client 100 (e.g., a browser) can present the retrieved resource 104 to the user.

As shown in FIG. 2, an HTTP request 106 includes a URI (Universal Resource Identifier) 108 (e.g., a URL (Universal Resource Locator)) that identifies a requested resource 104 within a hierarchical location scheme. That is, the URI 108 describes a resource with increasing specificity, for example, first by identifying the domain 116 (e.g., www.domain.com) providing the requested resource 104, then by identifying the one or more directories 117 (e.g., "/directory/subdirectory") within the domain 116, and finally by identifying a file 118 (e.g., "filename.html") within the identified set of directories 117.

The HTTP request 106 also can include other information such as the type of client 110 making the request (e.g., a Microsoft® Internet Explorer browser), the preferred language of a user 112, and other information 114. A request 106 can vary in size from a few bytes to several kilobytes.

The exchange shown in FIG. 1 is a simplification of network communication. In fact, a request typically passes through many intermediate agents before reaching a server 102. One type of intermediate agent is a proxy 120. As shown in FIG. 3, a proxy 120 receives requests from a client 100 and optionally sends them on to the server 102 providing a requested resource. The proxy 120 receives the server's response 108 and can send the response 108 on to the client 100. The proxy 120 can perform many functions in addition to acting as a conduit for client 100/server 102 communication. For example, by examining information stored in requests and/or responses, the proxy 120 can act as a filter, for example, by intercepting mature content before it reaches a client 100 used by a child.

As shown in FIG. 4, many different users often request the same resource (e.g., Web-page). Thus, storing commonly requested resources in a cache 126 can reduce the amount of time it takes to provide a response to a request. As shown, a cache database table 128 stores client requests 130 and previously received server responses 132 to these requests 130. The table 128 also can store an expiration date 134 for a stored response 132 and other information 136. Different cache functions handle storage and retrieval of information from the cache.

As shown in FIG. 5, a proxy 120 (e.g., a proxy at an ISP (Internet Service Provider)) initially receiving a request can forward the request to a cache proxy 124 that includes a cache database 126 and instructions that implement cache functions 125. These can functions 125 search, read, and write the cache database 126. When the cache proxy 124 receives a request, the cache proxy 124 searches the cache database 126 for a corresponding response.

Referring to FIG. 6, if a response corresponding to the request previously has been stored in the cache 124, the cache proxy 124 can return the response without accessing the server 102 from which the requested resource originally came. Eliminating transmission of the request from the proxy 120 to the server 102 and the corresponding transmission of a response from the server 102 back to the proxy 120 reduces client 100 access times and network traffic.

As shown in FIG. 7, if the cache 126 does not store a previous response to a request, the cache proxy 124 transmits a request to the server 102. Alternatively, the cache proxy 124 can transmit a request to the server 102 if the request includes a "pragma=no-cache" directive indicating that the response provided should not be retrieved from a cache. Regardless of whether a cache search failed or a request included a "pragma=no-cache" directive, the cache proxy 124 may store the response provided by the server 106 for future use.

As shown in FIG. 8, a proxy 120 may access multiple cache proxies 124, 138, 140, for example, cache proxies collected within the same ISP 122. This capability enables a single proxy 120 to access a very large number of cached responses. The proxy 120 routes a request received from a client to one of the cache proxies 124, 138, 140 by hashing (e.g., transforming information into a number) the domain 116 included in the URI 108 of the request. For example, hashing a domain of "www.a.com" may yield a "1" while hashing a domain of "www.b.com" may yield a "2." These requests can be sent to cache proxy 124 and 138, respectively. This scheme collects the different resources provided by the same domain into the same cache proxy. For example, "www.a.com/a.html" will share the same domain and reside on the same cache 124.

As described above, a cache proxy 124, 138, 140 may not previously have cached a response corresponding to a particular request. In such a case, the cache proxy 124 transmits the request to the server providing a particular resource. For example, as shown, a request for "www.c.com/c" is routed to cache proxy #2 140 based on the request's URI domain information ("www.c.com"). The cache proxy 140, however, must transmit the request to the server 102 providing the resource since the cache does not yet store "www.c.com/c." Upon receipt of the response, the cache proxy 140 can store "www.c.com/c" in its cache for future use.

To summarize, as shown in FIG. 9, a proxy 120 using multiple cache proxies receives a request 142 and performs 144 a hash function on the domain information included in the URI of the request. Based on the hash results, the proxy 120 transmits 146 the request to one of the cache proxies 124, 138, and 140.

The cache proxy 124, 138, 140 receiving 148 the request can determine whether to search its cache 150. If the cache proxy searches 160 and finds 162 a response corresponding to the request in its cache, the cache proxy 124, 138, 140 can return 164 the found response to the proxy 120. If the cache proxy decided 150 not to search its cache or failed 162 in its search for the request, the cache proxy sends 166 the request on to the server identified by the request URI. After the cache proxy receives the response, the cache proxy can determine 168 whether to store 170 the response in its cache to speed future requests. The cache proxy then returns 172 the received response to the proxy 120 for transmission to the client making the request.

The present inventors recognized that the method of distributing responses among caches described above can result in a distribution that underutilizes the caches.

SUMMARY

In general, in one aspect, a method of selecting one of a plurality of caches that store information received from at least one network site includes receiving information that identifies the location of a resource within a domain and selecting a cache based on the information that identifies the location of the resource within the domain.

Embodiments may include one or more of the following features. Receiving information may include receiving a request such as an HTTP (HyperText Transfer Protocol) request. The information may include a URI (Universal Resource Identifier) (e.g., a URL (Universal Resource Locator)) identifying the location of a resource. Selecting a cache may be based on the domain of the resource in addition to the location of a resource within the domain. Selecting a cache may include use of a hashing function. Selecting a cache may include selecting a cache proxy. The method may also include sending a request to the selected cache proxy.

The information identifying the location of a resource within a domain can include one or more directories and/or a file name.

In general, in another aspect, a method of selecting one of a plurality of caches that store information received from a network site includes receiving information that identifies a location of a resource expressed using a hierarchical location scheme that includes identifiers corresponding to different hierarchical levels, and selecting a cache based on information identifiers that correspond to more than one hierarchical level.

Embodiments may include one or more of the following features. A hierarchical level may be a domain. A hierarchical level may be the location of a resource within a domain.

In general, in another aspect, a method of selecting one of a plurality of caches that store information received from a network site includes receiving information that identifies a location of a resource; and selecting a cache based on all the received information identifying the location of the resource.

In general, in another aspect, a method of selecting one of a plurality of caches that store information received from at least one network site includes receiving an HTTP (HyperText Transfer Protocol) request that includes a URI (Universal Resource Identifier) identifies the location of a resource within a domain and selecting a cache proxy by hashing the URI domain and URI information that identifies the location of the resource within the domain. The method further includes sending a request to the selected cache proxy.

In general, in another aspect, a computer program product, disposed on a computer readable medium, for selecting one of a plurality of caches that store information received from at least one network site, includes instructions for causing a processor to receive information that identifies the location of a resource within a domain, and select a cache based on the information that identifies the location of the resource within the domain.

In general, in another aspect, a system for handling requests for information provided by a network server includes a plurality of cache proxies and a front-end proxy. The front-end proxy includes instructions for causing the front-end proxy processor to receive information that identifies the location of a resource within a domain, and select a cache based on the information that identifies the location of the resource within the domain.

Advantages may include one or more of the following. Performing a hash that includes the resource information of a URI spreads storage of resources provided by a particular domain across multiple caches. Because a handful of domains receive the lion's share of requests (e.g., "www.aol.com"), spreading the resources provided by these domains over multiple caches enables more efficient use of the caches as each cache reads and writes a substantially equal number of requests and responses. Thus, no one cache becomes overloaded with request processing while other caches remain underutilized.

Modifying the instructions of a proxy instead of modifying the instructions executed by cache proxies reduces the difficulty of incorporating these techniques into an existing network configuration.

The details of one or more embodiments of the invention are set forth in the accompanying drawings and description below. Other features, objects, and advantages of the invention will be apparent from the description and drawings, and from the claims.

DRAWING DESCRIPTIONS

DETAILED DESCRIPTIONS

Figure 10:
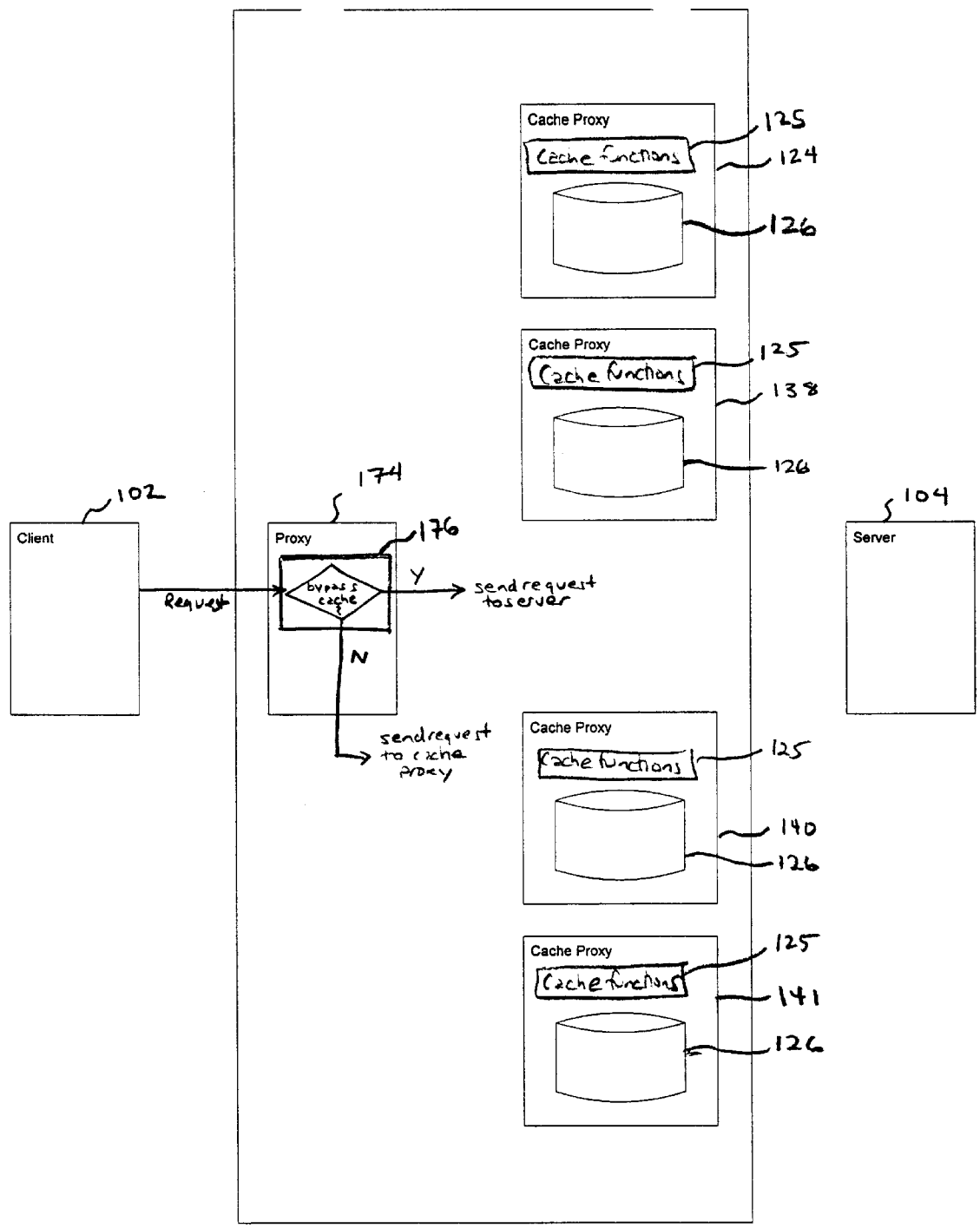
FIG. 10 is a diagram of a proxy that includes instructions for determining whether to bypass cache functions based on a request.

Referring to FIG. 10, a proxy 174 uses multiple caches 126 to store server responses. As shown, the caches 126 and cache functions 125 are included in cache proxies 124, 138, 140, 141. Because communications between the proxy 174 and a cache proxy 124, 138, 140, 141 can conform to HTTP standards, encapsulating a cache 124 and its associated functions 125 in a cache proxy offers programmers a simple method of integrating cache functions into existing processing. A cache proxy, however, is not necessarily required to implement cache functions (e.g., instructions that search, read, or write cache information). For example, a single monolithic proxy could manage different caches without using independent cache proxies.

Although caches can reduce the amount of time required to produce a response for a given request, the use of a cache is not without costs. For example, searching the cache for a particular request can be time consuming. When such a search is unsuccessful, the use of a cache actually increases the amount of time taken to process a request. In many cases, the extra time spent searching a cache unsuccessfully and storing a server's subsequent response is justified by the time savings enjoyed by future requests. However, as will be discussed, this is not always the case.

As shown in FIG. 10, the proxy 174 includes instructions 176 that determine whether to bypass cache functions 125 based on a received request. Conditional use of cache functions 125 enables the proxy 174 to identify situations where cache functions 125 are likely to slow processing of a current request without a compensating reduction in the time needed to process future requests. For example, attributes of a request may indicate that a cache is unlikely to have previously stored a corresponding response. The request's attributes may further indicate that any response provided by a server is unlikely to be added to the cache for future use. In such circumstances, executing cache functions 125 offers neither short-term nor long-term reductions in access times. As a result of this cost-benefit analysis, the conditional use of cache functions enables a proxy to provide the benefits of cache functions without needlessly suffering their potential inefficiencies.

Figure 11:
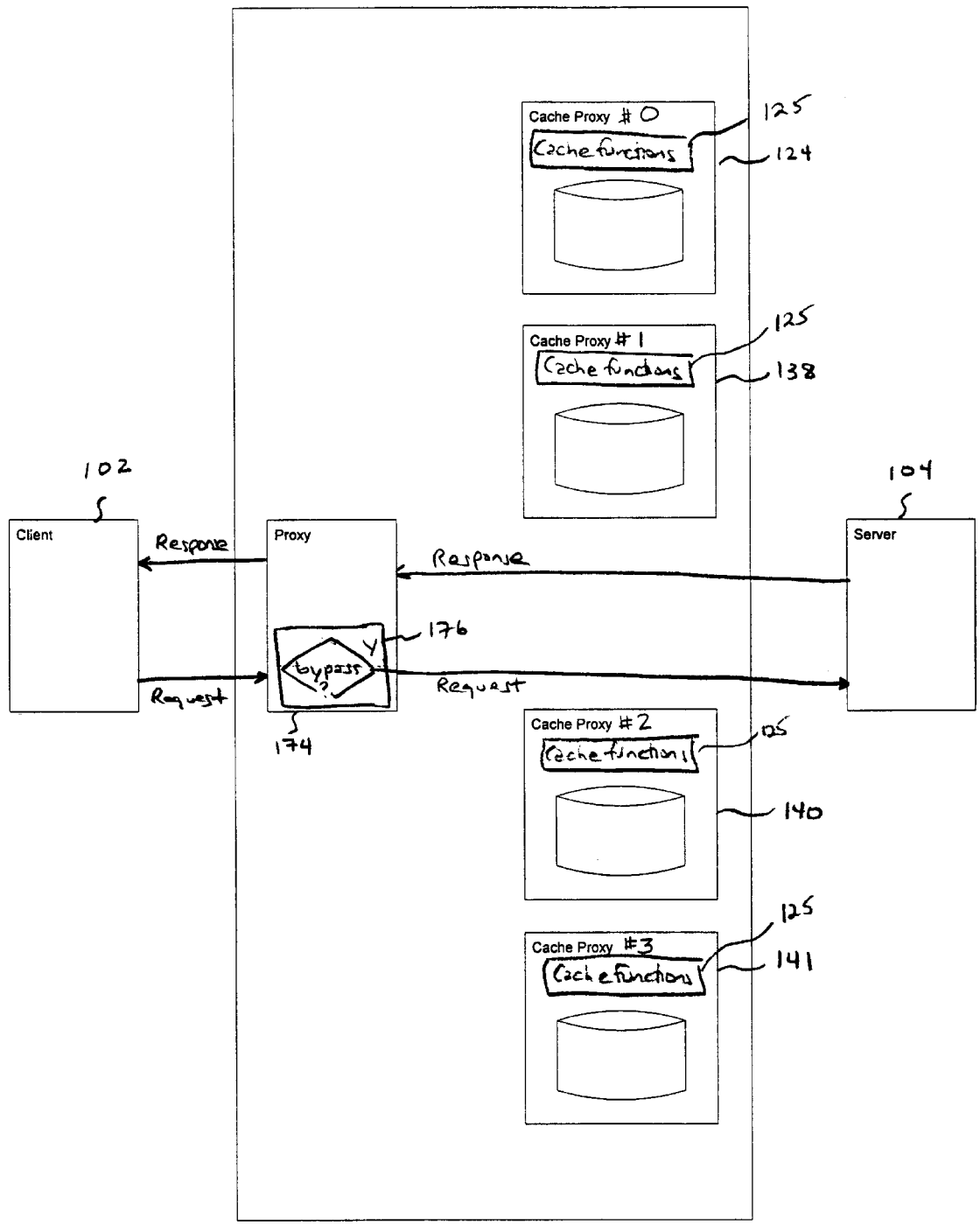
FIG. 11 is a flow diagram of a proxy bypassing cache functions.

Referring to FIG. 11, upon receiving a request, the instructions 176 for the proxy 174 determine whether to bypass caching functions based on the request. If the proxy 174 determines not to use cache functions 125, the proxy 174 sends a request to the server 104. Bypassing the caches 124, 138, 140, 141 saves the amount of time needed to search a cache and to store a response in the cache database.

Bypassing the cache proxies 124, 138, 140, 141 also reduces the number of agents that process a request. This eliminates the computational overhead that would otherwise be added by a cache proxy that processes a request. For example, each agent typically parses a received request to extract information. While parsing is conceptually straightforward, parsing can be computationally intensive if a request is large and/or includes variable length data. Hence, eliminating parsing performed by a cache proxy 124, 138, 140, 141 can produce surprisingly large reductions in access times.

Figure 1:
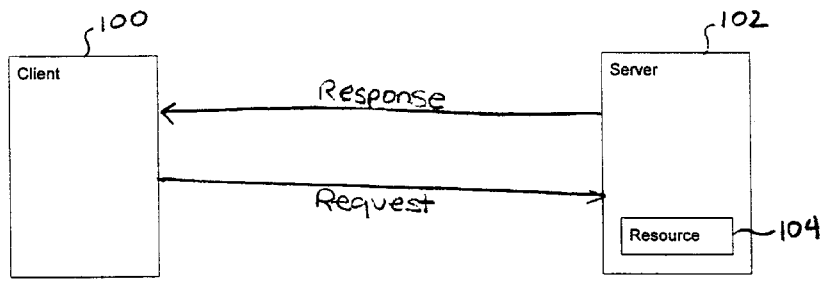
FIG. 1 is a flow diagram of a client/server request/response exchange.
Figure 2:
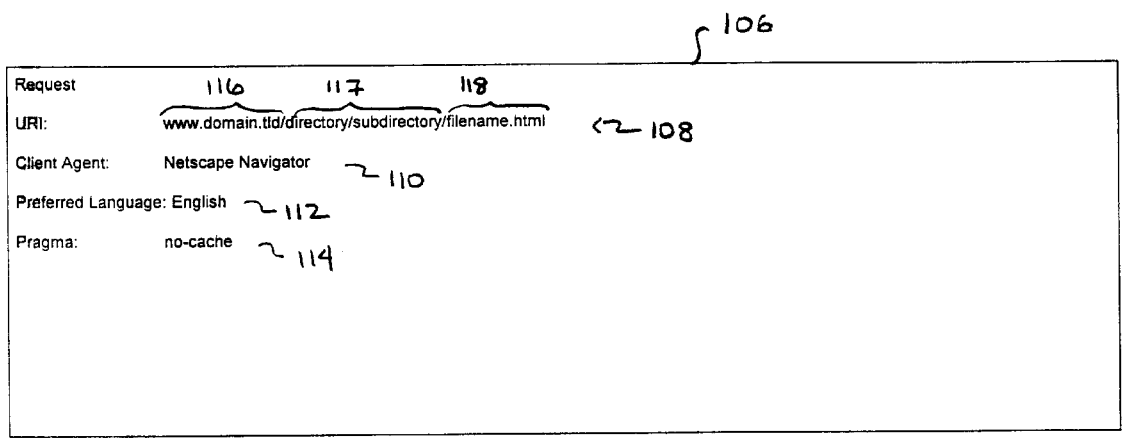
FIG. 2 is a diagram of an HTTP request.
Figure 3:
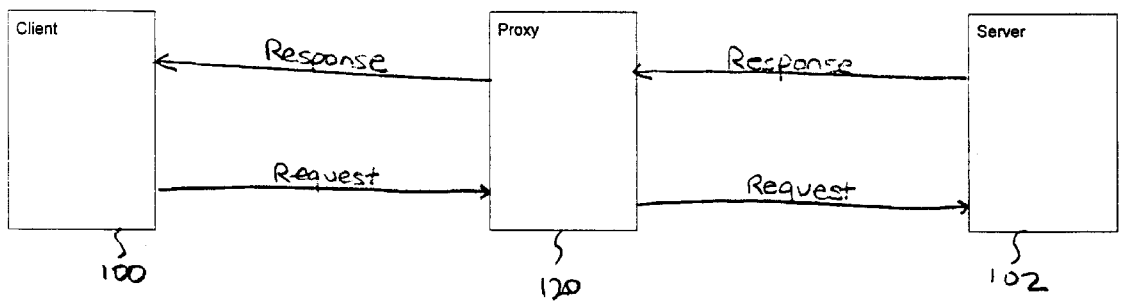
FIG. 3 is a flow diagram of requests and responses exchanged between a client, server, and proxy.
Figure 5:
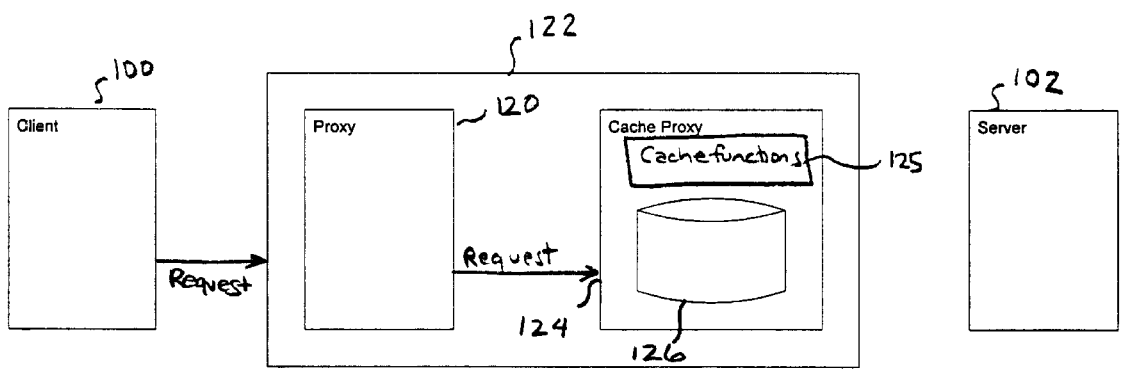
FIG. 5 is a diagram of a proxy and cache proxy.
Figure 4:
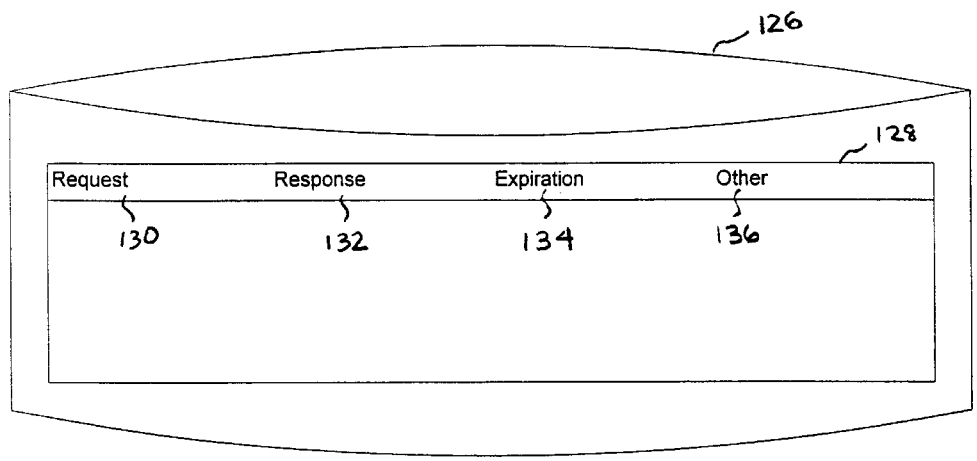
FIG. 4 is a diagram of a cache for storing server responses.
Figure 6:
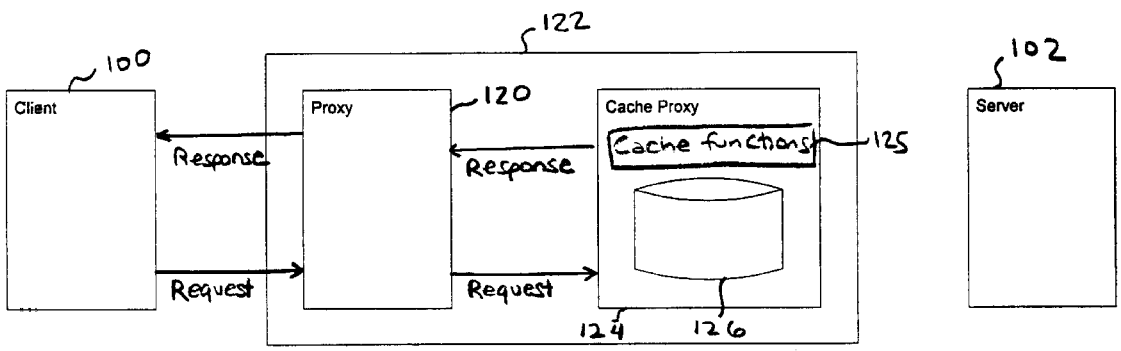
FIG. 6 is a flow diagram illustrating retrieval of a response from a cache proxy.
Figure 7:
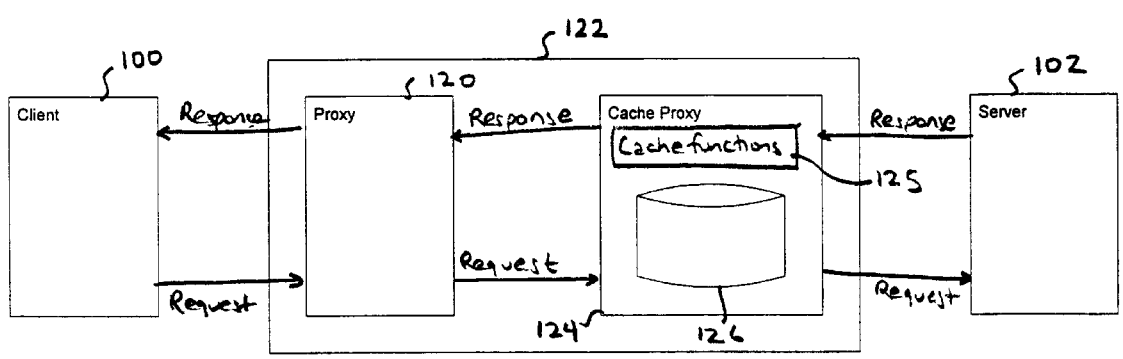
FIG. 7 is a flow diagram illustrating storage of a response in a cache proxy.
Figure 8:
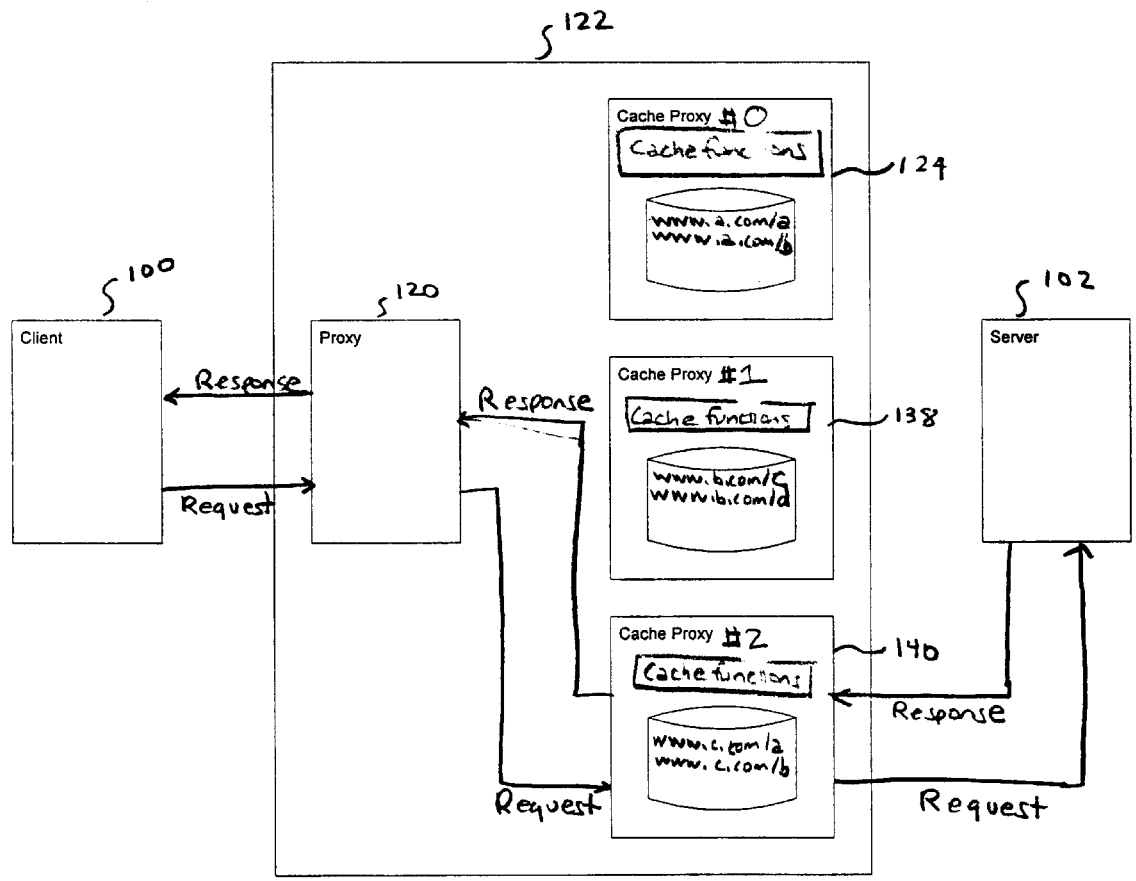
FIG. 8 is a flow diagram illustrating operation of multiple cache proxies.
Figure 9:
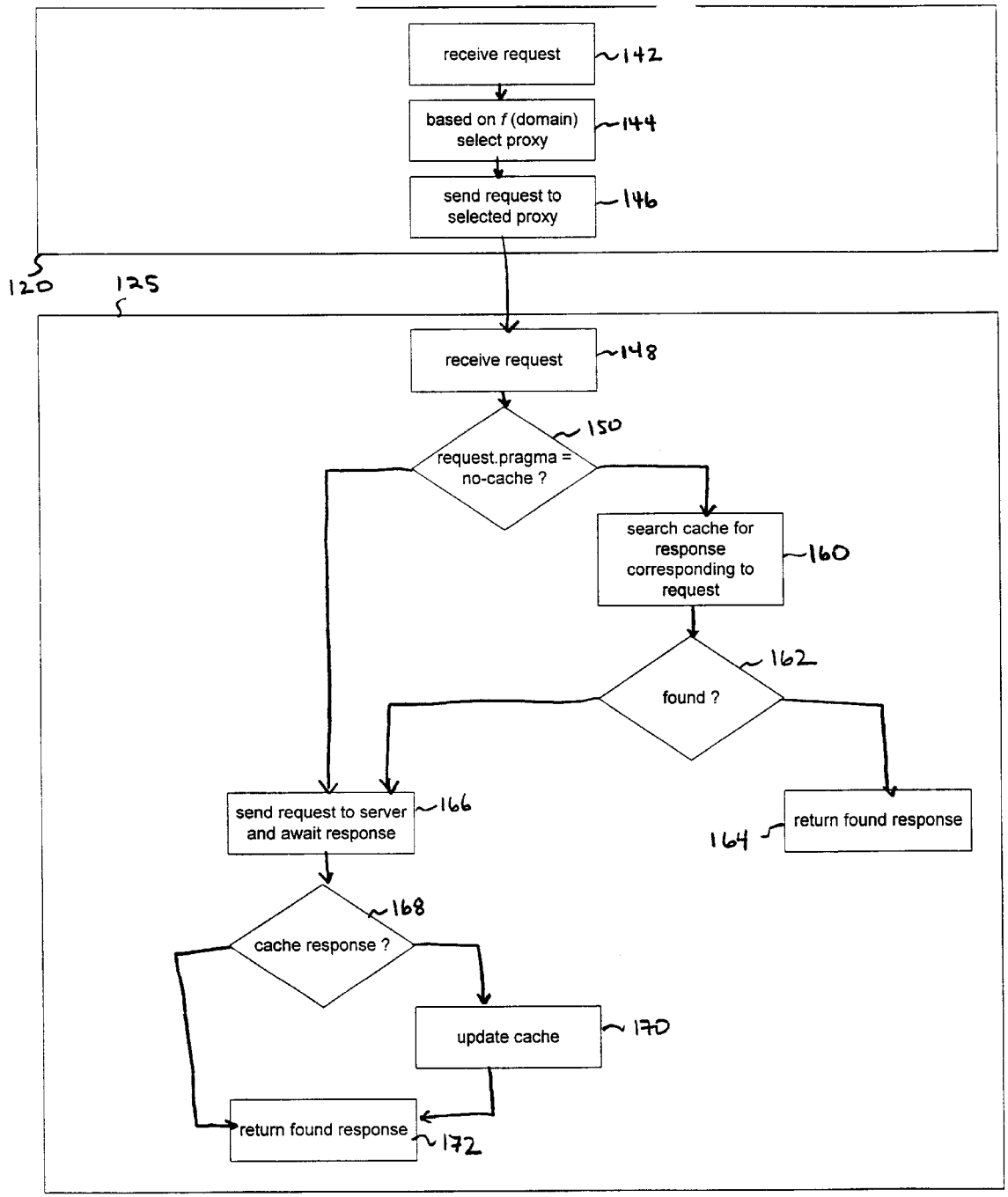
FIG. 9 is a flow chart of a process for using multiple cache proxies.
Figure 12:
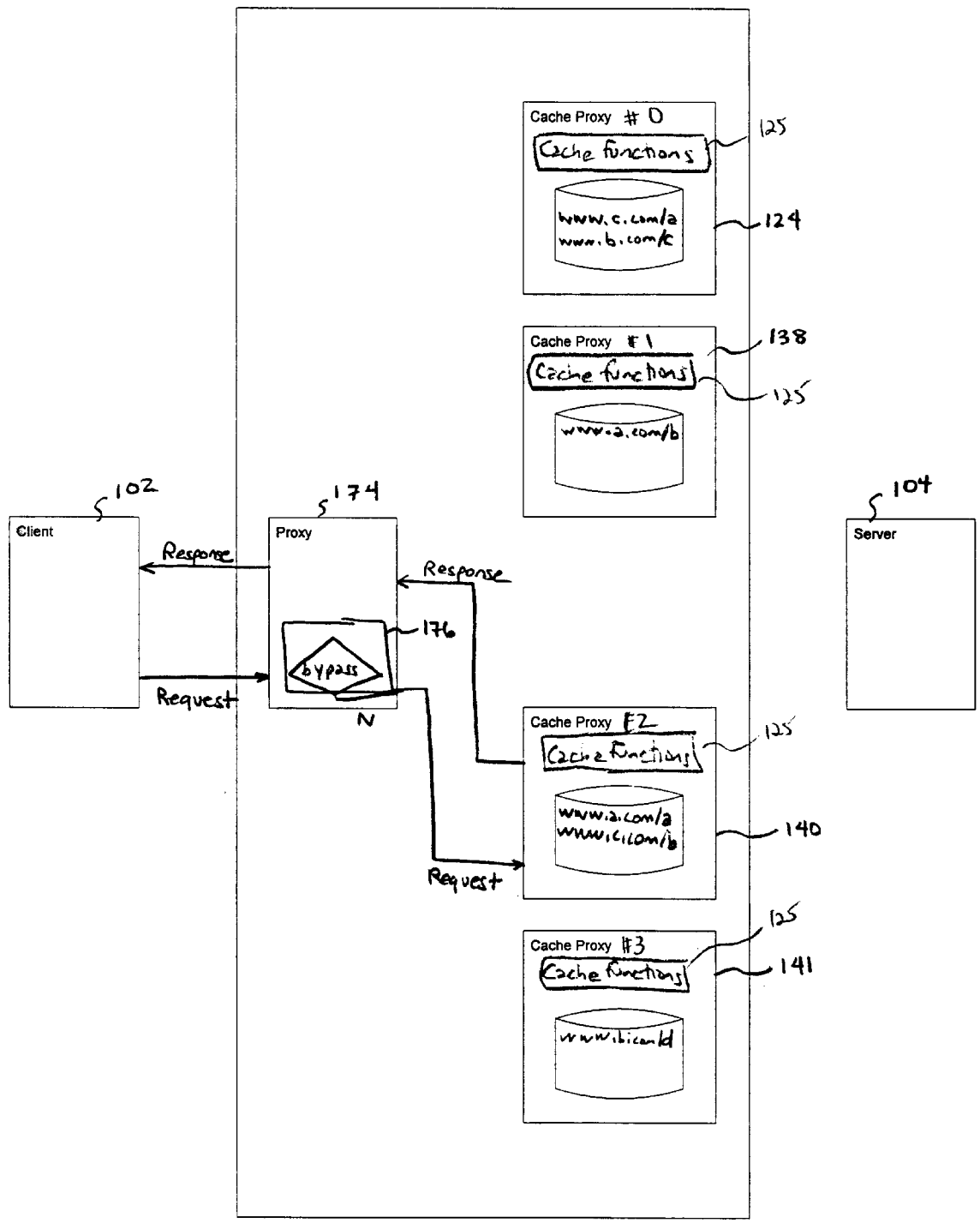
FIG. 12 is a flow diagram of a proxy that selects a cache based on information that indicates the location of a resource within a domain.

Referring to FIG. 12, if the instructions 176 for proxy 174 decide to use cache functions, the proxy 174 sends the request to a cache proxy 124, 138, 140, 141. The proxy 174 selects a cache based at least in part on information 117, 118 (FIG. 2) included in the URI of a request that identifies the location of a resource within a domain. For example, the proxy 174 could select a cache based on the resource location (e.g., "directory/subdirectory/a.html") or the resource location in addition to the URI domain (e.g., "www.domain.com/directory/subdirectory/a.html"). For example, the proxy 174 can implement a hash function that transforms a complete URI into a number. For example, a hash function could add the ASCII (American Standard Code for Information Interchange) values of all the characters in the URI and module divide by the number of caches. Hashing to a number between 1 and a prime number is believed to produce an even distribution of values. Hence, a system that includes a prime number of caches may evenly distribute responses among the caches. Other cache functions can easily be used instead of the sample function described above. The hash described above and others can be used in systems that do not use a prime number of caches.

Based on the results of the hash function, the proxy instructions can select a cache. For example, if the hash of "www.c.com/a" yielded "0" and an Internet Service Provider had four cache proxies, the proxy 174 could send the request to cache proxy #0 124.

Selecting a cache based on information that indicates the location of a resource within a domain distributes different resources provided by a server 104 across multiple caches 124, 138, 140, 141. For example, the resources "a" and "b" provided by "www.a.com" are cached by cache proxies 140 and 138, respectively. Because a handful of domains receive the large majority of requests (e.g., "www.NewYorkTimes.com"), spreading the resources provided by these servers over multiple caches enables more efficient use of the caches as each cache reads and writes a substantially equal number of requests and responses. Thus, the hashing scheme enforces load balancing and no cache becomes overloaded with requests while other caches are underutilized.

Figure 13:
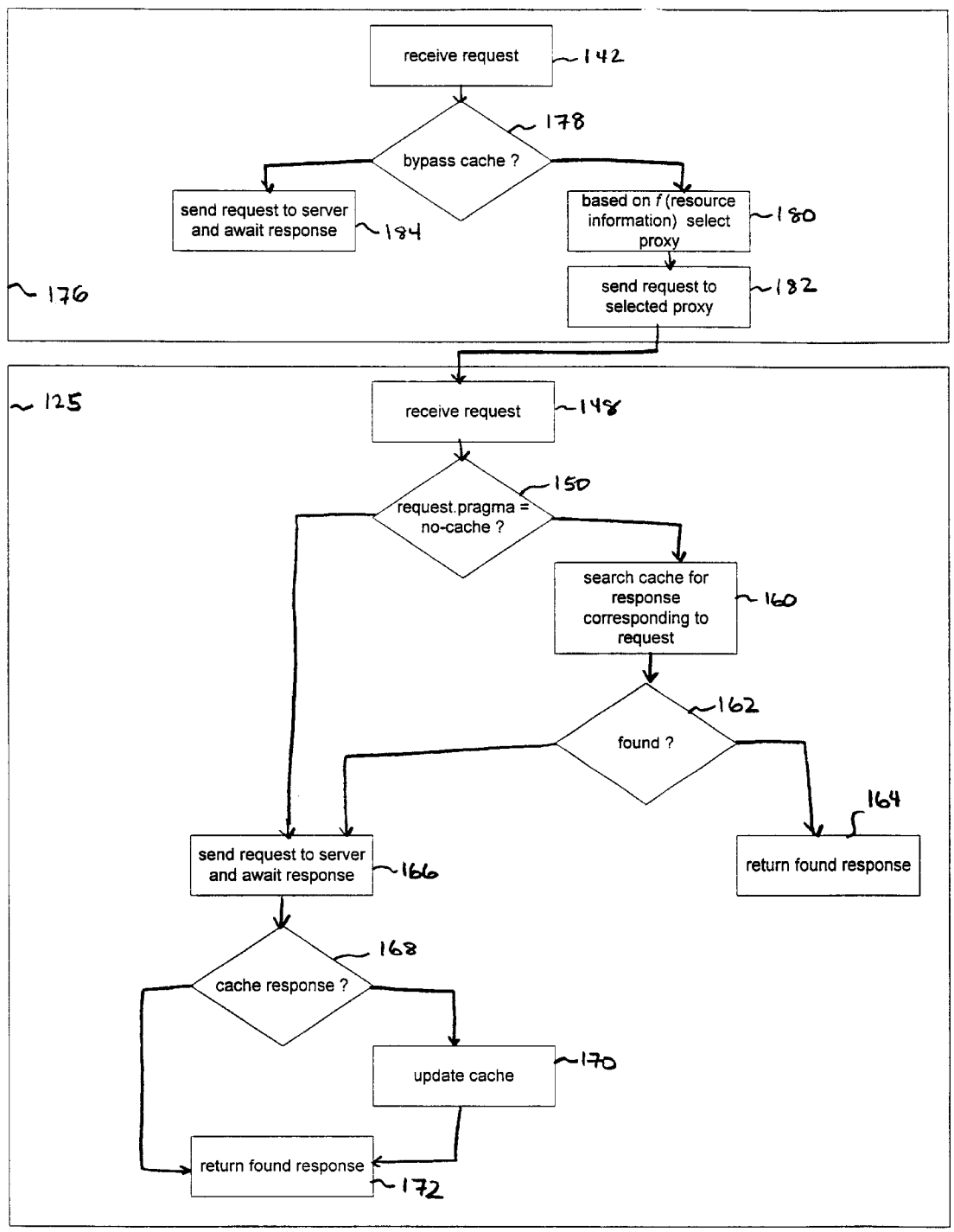
FIG. 13 is a flowchart of proxy instructions for bypassing cache functions and selecting a cache.

Referring also to FIG. 13, after a proxy receives a request 142, the proxy instructions 176 determine 178 whether or not to bypass cache functions 125. If the proxy instructions 176 decide to bypass cache functions 125, the proxy sends 184 the request on to the server and awaits the server's response for subsequent transmission back to the client.

If the proxy instructions 176 decide not to bypass cache functions 125, the proxy instructions 176 select 180 a cache based on resource information included in the URI of the request. The proxy instructions 176 send the request to the selected cache 182. As the bypassing and selection instructions are implemented by the proxy 174, the cache proxies 124, 138, 140, 141 need not be altered. As a result, the cache bypassing and selection mechanisms are transparent to the cache proxies. This enables an administrator to integrate the bypassing and cache selection techniques in an existing network of proxies with a minimum of reconfiguration.

Figure 14:
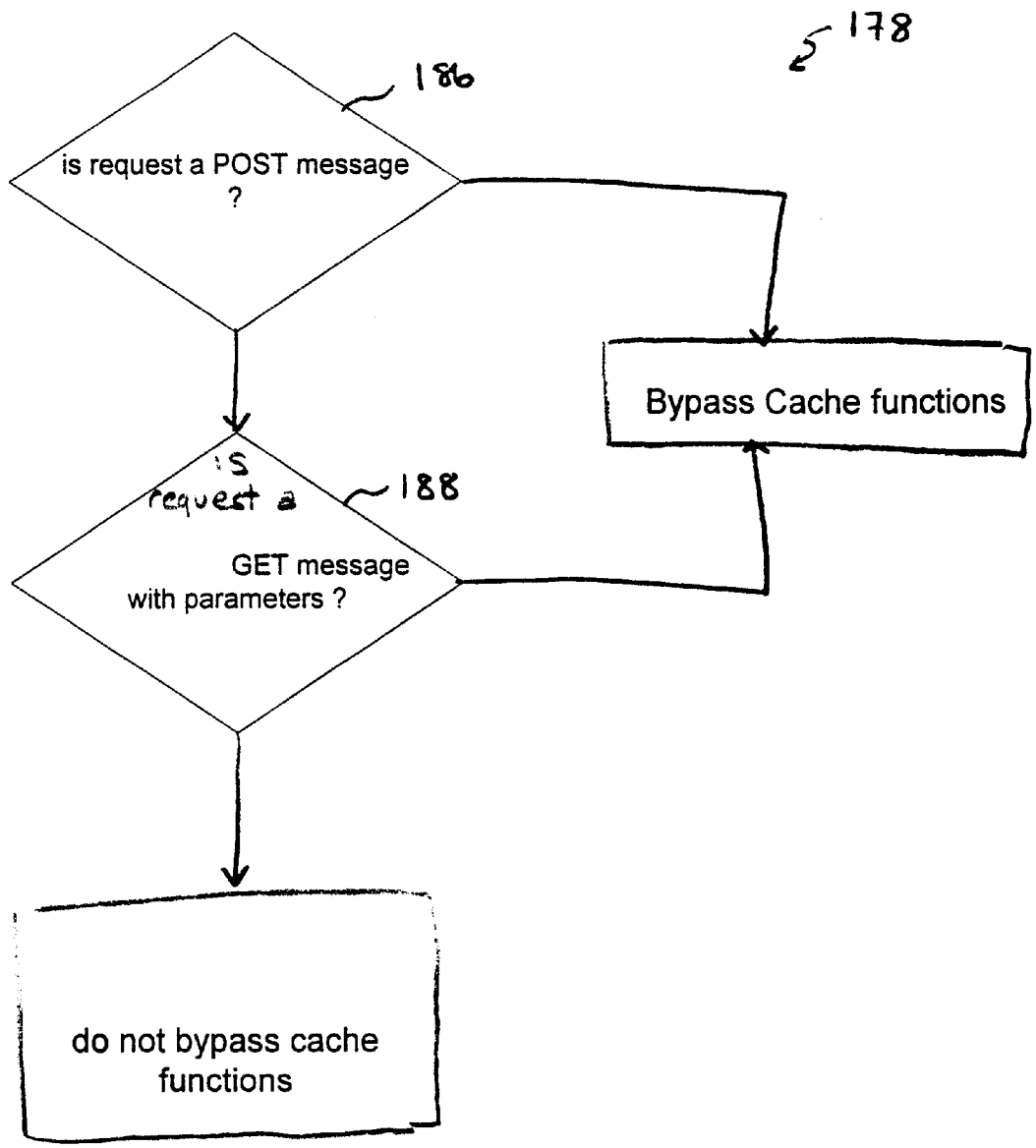
FIG. 14 is a flow chart of proxy instructions for determining whether to bypass cache functions.

Referring to FIG. 14, the proxy 174 can determine whether to bypass caching functions by examining attributes of a received request. For example, an HTTP request can identify itself as being a "POST" or "GET" request. A "POST" request that "posts" (i.e., sends) data to a server such as information a user entered into a web-page form. A "GET" request "gets" a resource identified by a URI (e.g., "GET www.domain.com/a.html"). A "GET" request can include parameters for processing by a server. Such "GET" requests include information following a "?" delimiter. For example, "GET www.a.com/cgi-bin/ProcessName.cgi?Name=JohnDoe" sends the "Name=JohnDoe" as a parameter.

The HTTP specification mandates that responses to both "POST" and "GET" requests that include parameters must not be cached. This prevents users from receiving inaccurate information. For example, if a first POST request includes data entered by a user into an order form for widgets, the server's response "thank you for your order of widgets" should not be cached. If such a response was cached, the user's second order of widgets would not reach the server but nevertheless result in a cached response of "thank you for your order of widgets."

Thus, these requests can neither be satisfied by accessing a cache nor can responses to these requests add to the information stored in a cache. By making a single determination to bypass caching functions 125 based on whether a request is a POST request 186 or a GET request that includes parameter 188, a proxy 174 can reduce the amount time needed to service a request.

An administrator may choose to bypass cache functions based on other request information. For example, because CGI (Common Gateway Interface) script responses often expire very quickly and often produce different responses for the same requests, an administrator may elect to bypass cache functions for requests including the letters "cgi" in the request URI.

The methods and techniques described here may be implemented in digital electronic circuitry, or in computer hardware, firmware, software, or in combinations of them. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM disks. Any of the foregoing may.be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, the distribution of the functions and components need not be as shown, but can instead be distributed over any number of computers or networks. Additionally, although we use the terms client and server, any given program may be capable of acting as either a client or server; our use of these terms may refer only to the role being performed by the program for a particular connection, rather than to the program's capabilities in general. Accordingly, other embodiments are within the scope of the following claims.

What is claimed is:

1. A method of handling requests received from a client for information stored on a server, the method comprising:

receiving a request for the information, the request including a location identifier for the information;

examining attributes of the request to determine whether an execution of cache functions in an attempt to access the information from cache is likely to slow processing of a request for the information without at least some compensating reduction in processing time for a request for the information received at a later time;

causing an execution of cache functions in an attempt to access the information from a cache in response to a determination that an execution of cache functions in an attempt to access the information from cache is not likely to slow processing of a request for the information without at least some compensating reduction in processing time for a request for the information received at a later time; and bypassing an execution of cache functions and causing the information to be accessed directly from the server in response to a determination that an execution of cache functions in an attempt to access the information from cache is likely to slow processing of a request for the information without at least some compensating reduction in processing time for a request for the information received at a later time.

2. The method of claim 1 wherein the request is an HTTP request.

3. The method of claim 2 wherein examining the attributes of the HTTP request includes determining whether the HTTP request is a GET request.

4. The method of claim 2 wherein examining the attributes of the HTTP request includes determining whether the HTTP request is a POST request.

5. The method of claim 1 wherein examining attributes of the request comprises examining the location identifier provided with the request.

6. The method of claim 5 wherein the location identifier comprises a URI, the URI including letters.

7. The method of claim 6 wherein examining the URI comprises determining whether the letters of the URI include "cgi".

8. The method of claim 1 wherein the server comprises an Internet accessible computer.

9. The method of claim 1 further comprising:

hashing the location identifier;

selecting at least one of several caches based on a result of the hashing; and wherein causing an execution of cache functions comprises causing an execution of cache functions associated with the selected cache in an attempt to access the information from the selected cache.

10. The method of claim 9 wherein the hashing comprises a deterministic protocol for distributing received requests for information evenly among the several caches.

11. A computer program, disposed on a computer readable medium, for handling requests received from a client for information stored on a server, the computer program including instructions for causing a processor to:

receive a request for the information, the request including a location identifier for the information;

examine attributes of the request to determine whether an execution of cache functions in an attempt to access the information from cache is likely to slow processing of a request for the information without at least some compensating reduction in processing time for a request for the information received at a later time;

cause an execution of cache functions in an attempt to access the information from a cache in response to a determination that an execution of cache functions in an attempt to access the information from cache is not likely to slow processing of a request for the information without at least some compensating reduction in processing time for a request for the information received at a later time; and bypass an execution of cache functions and cause the information to be accessed directly from the server in response to a determination that an execution of cache functions in an attempt to access the information from cache is likely to slow processing of a request for the information without at least some compensating reduction in processing time for a request for the information received at a later time.

12. The computer program of claim 11 wherein the request is an HTTP request.

13. The computer program of claim 12 wherein, to examine the attributes of the HTTP request, the computer program further includes instructions for causing a processor to determine whether the HTTP request is a GET request.

14. The computer program of claim 12 wherein, to examine the attributes of the HTTP request, the computer program further includes instructions for causing a processor to determine whether the HTTP request is a POST request.

15. The computer program of claim 11 wherein, to examine attributes of the request, the computer program further includes instructions for causing a processor to examine the location identifier provided with the request.

16. The computer program of claim 15 wherein the location identifier comprises a URI, the URI including letters.

17. The computer program of claim 16 wherein, to examine the URI, the computer program further includes instructions for causing a processor to determine whether the letters of the URI include "cgi".

18. The computer program of claim 11 wherein the server comprises an Internet accessible computer.

19. The computer program of claim 11 wherein the computer program further includes instructions for causing a processor to:

hash the location identifier;

select at least one of several caches based on a result of the hashing; and wherein causing an execution of cache functions comprises causing an execution of cache functions associated with the selected cache in an attempt to access the information from the selected cache.

20. The method of claim 19 wherein, to hash the location identifier, the computer program further includes instructions for causing a processor to implement a deterministic protocol for distributing received requests for information among the several caches.

21. A system for handling requests received from a client for information stored on a server, the system comprising:

a plurality of cache proxies, each cache proxy including a cache database and cache functions for accessing the cache database; and a front-end proxy, the front-end proxy including instructions for causing the front-end proxy to:

receive a request for the information, the request including a location identifier for the information;

examine attributes of the request to determine whether an execution of cache functions in an attempt to access the information from a cache database is likely to slow processing of a request for the information without at least some compensating reduction in processing time for a request for the information received at a later time;

in response to a determination that an execution of cache functions in an attempt to access the information from a cache database is not likely to slow processing of a request for the information without at least some compensating reduction in processing time for a request for the information received at a later time, select one of the cache proxies and send the request to the selected cache proxy such that the cache functions of the selected cache proxy are executed in an attempt to access the information from the cache database of the selected cache proxy; and in response to a determination that an execution of cache functions in an attempt to access the information from a cache database is likely to slow processing of a request for the information without at least some compensating reduction in processing time for a request for the information received at a later time, bypass an execution of cache functions and access the information directly from the server.

22. The system of claim 21 wherein the request is an HTTP request.

23. The system of claim 22 wherein, to examine the attributes of the HTTP request, the front-end proxy further includes instructions for causing the front-end proxy to determine whether the HTTP request is a GET request.

24. The computer program product of claim 22 wherein, to examine the attributes of the HTTP request, the front-end proxy further includes instructions for causing the front-end proxy to determine whether the HTTP request is a POST request.

25. The system of claim 21 wherein, to examine attributes of the request, the front-end proxy further includes instructions for causing the front-end proxy to examine the location identifier provided with the request.

26. The system of claim 25 wherein the location identifier comprises a URI, the URI including letters.

27. The system of claim 26 wherein, to examine the URI, the front-end proxy further includes instructions for causing the front-end proxy to determine whether the letters of the URI include "cgi".

28. The system of claim 21 wherein the server comprises an Internet accessible computer.

29. The system of claim 21 wherein the front-end proxy further includes instructions for causing the front-end proxy to:

hash the location identifier; and wherein the selected proxy to which the request is sent is selected based on a result of the hashing.

30. The system of claim 29 wherein, to hash the location identifier, the front-end proxy further includes instructions for causing the front-end proxy to implement a deterministic protocol for distributing received requests for information evenly among the plurality of cache proxies.

* * * * *